(12) United States Patent
Asaka

(10) Patent No.: US 12,298,694 B2
(45) Date of Patent: May 13, 2025

(54) FIXING FILM AND METHOD OF PRODUCING SAME, FIXING DEVICE, AND ELECTROPHOTOGRAPHIC IMAGE FORMING APPARATUS

(71) Applicant: CANON KABUSHIKI KAISHA, Tokyo (JP)

(72) Inventor: Akeshi Asaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/322,749

(22) Filed: May 24, 2023

(65) Prior Publication Data

US 2023/0393506 A1 Dec. 7, 2023

(30) Foreign Application Priority Data

Jun. 3, 2022 (JP) .................................. 2022-091019
May 12, 2023 (JP) .................................. 2023-079668

(51) Int. Cl.
*G03G 15/20* (2006.01)
*B32B 1/08* (2006.01)
*B32B 27/28* (2006.01)
*C08J 7/04* (2020.01)
*C09D 179/08* (2006.01)

(52) U.S. Cl.
CPC ............ *G03G 15/2057* (2013.01); *B32B 1/08* (2013.01); *B32B 27/281* (2013.01); *C08J 7/042* (2013.01); *C09D 179/08* (2013.01); *B32B 2307/746* (2013.01); *B32B 2457/00* (2013.01); *B32B 2597/00* (2013.01); *C08J 2327/18* (2013.01); *C08J 2379/08* (2013.01)

(58) Field of Classification Search
CPC .... G03G 15/2057; B32B 1/08; B32B 27/281; B32B 2307/746; B32B 2457/00; B32B 2597/00; B32B 27/08; B32B 2307/536; B32B 7/022; C08J 7/042; C08J 2327/18; C08J 2379/08; C09D 179/08; C08G 73/1071

See application file for complete search history.

(56) References Cited

U.S. PATENT DOCUMENTS 9,034,474 B2 5/2015 Kishino et al.
2011/0045310 A1 2/2011 Kishino et al.
2014/0105659 A1* 4/2014 Miyahara ........... G03G 15/2053
399/333

FOREIGN PATENT DOCUMENTS

JP 2002-162836 A 6/2002
JP 4429384 B1 3/2010

(Continued)

*Primary Examiner* — John D Freeman
(74) *Attorney, Agent, or Firm* — Venable LLP

(57) ABSTRACT

A fixing film including: a substrate having a cylindrical shape; a sliding layer that is formed on an inner peripheral surface side of the substrate and includes a polyimide resin; and a release layer that is formed on an outer peripheral surface side of the substrate, wherein the sliding layer has a first film and a second film laminated in the stated order from a side closer to the substrate, wherein the first film includes a first structural unit represented by a specific formula, or the first structural unit and a second structural unit represented by a specific formula, the second film includes only the second structural unit, and a mass ratio (A):(B) of the first structural unit and the second structural unit contained in the first film is 100:0 to 60:40.

9 Claims, 4 Drawing Sheets

(56) References Cited

FOREIGN PATENT DOCUMENTS

| | | |
|---|---|---|
| JP | 2017-219662 A | 12/2017 |
| JP | 2021-063868 A | 4/2021 |

* cited by examiner

FIXING FILM AND METHOD OF PRODUCING SAME, FIXING DEVICE, AND ELECTROPHOTOGRAPHIC IMAGE FORMING APPARATUS

BACKGROUND

Technical Field

The present disclosure relates to a fixing film and a method of producing the same, a fixing device, and an electrophotographic image forming apparatus.

Description of the Related Art

A fixing device of an on-demand fixing type mounted to an electrophotographic image forming apparatus includes a fixing film, a ceramic heater fixed to an inside thereof, and a pressure roller. Moreover, a fixing nip portion is formed by pressing the ceramic heater toward the pressure roller through the fixing film. As the pressure roller is driven to rotate, the fixing film rotates in association with the pressure roller while the inner peripheral surface thereof slides with respect to the ceramic heater. In the fixing film, a sliding layer including a heat resistant resin such as polyimide may be formed on the inner peripheral surface of a cylindrical substrate made of a metal (hereinafter sometimes referred to as "metal substrate") from the viewpoint of improving the slidability of the fixing film with respect to the ceramic heater.

An invention according to Japanese Patent No. 4429384 relates to a fixing belt for use in an image-heating apparatus for heat-fixing an unfixed image. Moreover, in Japanese Patent No. 4429384, there is a disclosure that when a polyimide resin layer has an imidization ratio of from 70% to 93% and includes a combination of specified structural units, the polyimide resin layer can achieve both excellent flexibility and high abrasion resistance.

SUMMARY

At least one aspect of the present disclosure is directed to providing a fixing film in which peeling of a sliding layer from a substrate and occurrence of abnormal noise at the time of formation of an electrophotographic image can be prevented at high levels. In addition, at least one aspect of the present disclosure is directed to providing a fixing device that contributes to long-term stable formation of a high-quality electrophotographic image, and an electrophotographic image forming apparatus capable of stably forming a high-quality electrophotographic image.

According to at least one aspect of the present disclosure, there is provided a fixing film including: a substrate having a cylindrical shape; a sliding layer that is formed on an inner peripheral surface side of the substrate and includes a polyimide resin; and a release layer that is formed on an outer peripheral surface side of the substrate, wherein the sliding layer has a first film and a second film laminated in the stated order from a side closer to the substrate, wherein the first film includes one of a first structural unit represented by the following formula (A), or the first structural unit and a second structural unit represented by the following formula (B), and has a mass ratio (A):(B) between a content of the first structural unit and a content of the second structural unit of from 100:0 to 60:40, and wherein the second film includes only the second structural unit.

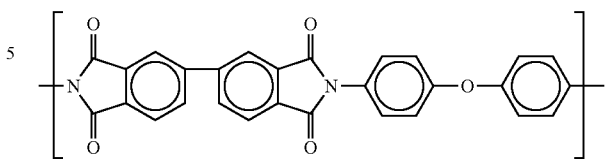

Formula (A)

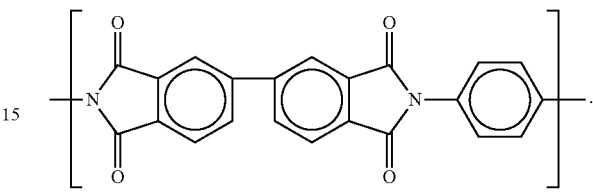

Formula (B)

In addition, according to at least one aspect of the present disclosure, there is provided a method of producing the above-mentioned fixing film, the method including: forming, on an inner peripheral surface of the substrate, a coated film of a first polyimide precursor solution obtained by mixing a polyamic acid A having a structural unit A represented by the following formula (a) and a polyamic acid B having a structural unit B represented by the following formula (b) at a mass ratio (structural unit A:structural unit B) between the structural unit A and the structural unit B of from 100:0 to 60:40; forming, on an inner peripheral surface of the coated film of the first polyimide precursor solution, a coated film of a second polyimide precursor solution including the polyamic acid B as only one polyamic acid; and imidizing one of the polyamic acid A, or the polyamic acid A and the polyamic acid B in the coated film of the first polyimide precursor solution to form the first film, and imidizing the polyamic acid B in the coated film of the second polyimide precursor solution to form the second film.

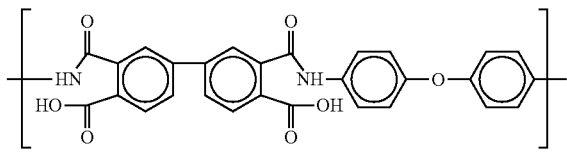

Formula (a)

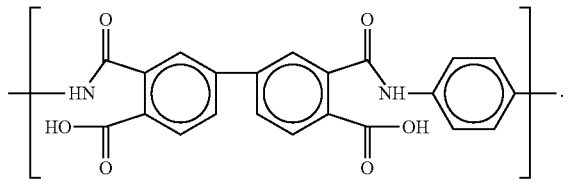

Formula (b)

In addition, according to at least one aspect of the present disclosure, there is provided a fixing device including the above-mentioned fixing film.

Further, according to at least one aspect of the present disclosure, there is provided an electrophotographic image forming apparatus including the above-mentioned fixing device.

Further features of the present disclosure will become apparent from the following description of exemplary embodiments with reference to the attached drawings.

DESCRIPTION OF THE EMBODIMENTS

Figure 1:
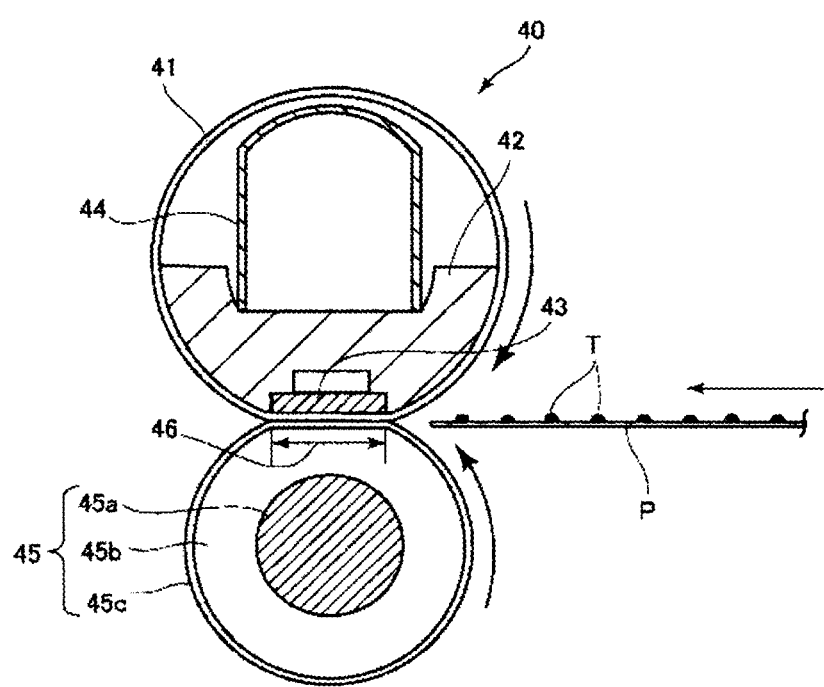
FIG. 1 is a schematic sectional view of a fixing device according to one embodiment of the present disclosure.

According to investigations made by the inventor on the fixing belt according to Japanese Patent No. 4429384, in sliding friction between a ceramic heater and a sliding layer, abnormal noise due to a stick-slip phenomenon occurred particularly at the time of low-speed driving having a low process speed in some cases. The abnormal noise is liable to occur when a static friction force between the ceramic heater and the sliding layer is larger than a dynamic friction force therebetween. This is presumably because as the process speed becomes lower, the period of time for which the ceramic heater and the inner peripheral surface of the fixing belt stick to each other becomes longer, and the static friction force therebetween becomes larger.

In view of the foregoing, the inventor has repeated investigations in order to solve the above-mentioned problem. As a result, the inventor has found that when a fixing film has the following configuration, peeling of a sliding layer from a substrate and occurrence of abnormal noise at the time of formation of an electrophotographic image can be prevented at high levels.

<Configuration>

A fixing film including: a substrate having a cylindrical shape; a sliding layer that is formed on an inner peripheral surface side of the substrate and includes a polyimide resin; and a release layer that is formed on an outer peripheral surface side of the substrate, wherein the sliding layer has a first film and a second film laminated in the stated order from a side closer to the substrate, wherein the first film includes one of a first structural unit represented by the following formula (A), or the first structural unit and a second structural unit represented by the following formula (B), and has a mass ratio (A):(B) between a content of the first structural unit and a content of the second structural unit of from 100:0 to 60:40, and wherein the second film includes only the second structural unit.

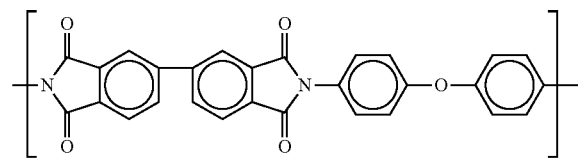

Formula (A)

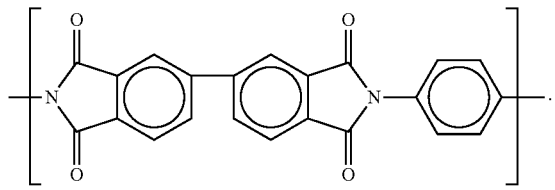

Formula (B)

Embodiments of the present disclosure are described below with reference to the drawings. However, the scope of the present disclosure is not limited to the embodiments, and various modifications may be made without departing from the gist of the present disclosure.

<Fixing Device>

A fixing device according to one embodiment of the present disclosure is described with reference to FIG. 1.

A fixing device 40 of this embodiment is of an on-demand fixing type using a ceramic heater 43 as a planar heating element. The fixing device 40 includes: a fixing film 41 having a cylindrical shape; the ceramic heater 43 serving as a heating element-cum-sliding member; a film guide-cum-heater holder 42 serving as a sliding member; and a pressure roller 45 that forms a fixing nip portion 46 with the fixing film 41. The fixing film 41 is backed up by the ceramic heater 43 and the film guide-cum-heater holder 42 in the fixing nip portion 46. That is, the ceramic heater 43 and the film guide-cum-heater holder 42 may also be said to be back-up members for the fixing film 41.

The ceramic heater 43 has a resistance heating element formed therein by applying, on a substrate made of aluminum nitride, a conductive paste containing a silver-palladium alloy in a film shape having a uniform thickness by a screen printing method. The ceramic heater 43 is fixed and supported by the film guide-cum-heater holder 42 while being fitted to a groove portion formed along a longitudinal direction of the film guide-cum-heater holder 42 (width direction perpendicular to a conveyance direction of a recording material, a front-back direction of the drawing sheet of FIG. 1). Moreover, it is configured that the inner peripheral surface of the fixing film 41 and the back surface of the substrate (a surface opposite to a surface on which the resistance heating element is formed) are slidable with respect to each other. In addition, the ceramic heater 43 is energized with a unit (not shown) to generate heat, and is controlled to a predetermined preset temperature.

As described below, the fixing film 41 has a configuration in which a sliding layer using a polyimide resin is formed on an inner peripheral surface side of a cylindrical substrate. The fixing film 41 is an endless film that, in a use state, rotates in association with the rotation of the pressure roller 45 while an inner peripheral surface side thereof is rubbed with the film guide-cum-heater holder 42 and the ceramic heater 43. Both end portions in a rotation axis direction of the fixing film 41 are supported in a rotatable manner by a fixing portion (not shown) such as a frame of the fixing device 40.

In addition, the film guide-cum-heater holder 42, the ceramic heater 43, and a stay 44 serving as a support member are arranged in the inside of the fixing film 41. The stay 44 is arranged in the rotation axis direction of the fixing film 41, and both end portions thereof are supported by the fixing portion (not shown) such as a frame of the fixing device 40. Moreover, the film guide-cum-heater holder 42 is supported by the stay 44.

The film guide-cum-heater holder 42 is molded with, for example, a liquid crystal polymer having heat resistance and a heat insulating property, and is arranged in the rotation axis direction of the fixing film 41 along the stay 44. The fixing film 41 is loosely fitted onto the film guide-cum-heater holder 42. Moreover, the rotation of the fixing film 41 is controlled and guided while the inner peripheral surface of the fixing film 41 is rubbed with the outer peripheral surface of the film guide-cum-heater holder 42 formed in a partially cylindrical shape.

A lubricant (grease) in a semi-solid state (not shown) containing a solid component (thickener) and a base oil component (oil) is applied onto the inner peripheral surface of the fixing film 41. Thus, slidability between the ceramic heater 43 and the sliding layer of the fixing film 41 is ensured. Examples of the thickener include: solid lubricants, such as graphite and molybdenum disulfide; metal oxides, such as zinc oxide and silica; and fine particles of fluororesins, such as polytetrafluoroethylene (PTFE), a tetrafluoroethylene-perfluoroether copolymer (PFA), and a tetrafluoroethylene-hexafluoropropylene copolymer (FEP). Those thickeners are each added to the lubricant as powder having a particle diameter of about 3 In addition, examples of the base oil component include polymer resin oils each having heat resistance, such as a silicone oil, a fluorosilicone oil, and perfluoropolyether (PFPE).

The pressure roller 45 includes: a mandrel 45a made of stainless steel; a silicone rubber elastic layer 45b; and a surface layer 45c formed of a fluororesin (PFA) tube for imparting releasability. Moreover, both-end shaft portions of the mandrel 45a are borne and supported by the fixing portion (not shown) in a rotatable manner. Such pressure roller 45 is connected to a rotational drive device (not shown) such as a motor, and is driven to rotate at the time of use.

In addition, both the end portions of the stay 44 are pressed to the pressure roller 45 at a pressure on one end side of 16 kgf (156.8 N), that is, at a total pressure of 32 kgf (313.6 N) by a spring pressure mechanism (not shown). Thus, the lower surface of the ceramic heater 43 is brought into pressure contact with the elastic layer of the pressure roller 45 through the fixing film 41 with predetermined pressing force, to thereby form the fixing nip portion 46 having a predetermined width required for fixing of a toner.

The pressure roller 45 is connected to the rotational drive device (not shown), and when the fixing film 41 rotates in association with the pressure roller 45, a recording material is nipped and conveyed through the fixing nip portion 46. In addition, the surface of the fixing film 41 is heated to a predetermined temperature required for melting of a toner with the ceramic heater 43. The predetermined temperature is detected with a thermistor (not shown) serving as a temperature detecting unit arranged so as to be brought into contact with the inner peripheral surface of the fixing film 41, and is controlled by controlling energization of the ceramic heater 43 with a controller (not shown).

As described above, under the state in which the surface of the fixing film 41 is controlled to a predetermined temperature, a recording material P having an image formed thereon with an unfixed toner is nipped and conveyed through the fixing nip portion 46. Thus, the recording material P brought into abutment with the outer peripheral surface of the fixing film 41 is heated. As a result, a toner image T on the recording material P is heated and pressed to cause melting and color mixing of toners, followed by cooling, to thereby heat-fix the toner image T on the recording material P.

<Fixing Film>

A fixing film according to this embodiment is used for heat-fixing a toner image on a recording material on the outer peripheral surface thereof by rotating the fixing film while causing the inner peripheral surface side thereof to slide with respect to the back-up members through intermediation of a lubricant. The fixing film 41 of this embodiment is described with reference to FIG. 2 and FIG. 3.

Figure 2:
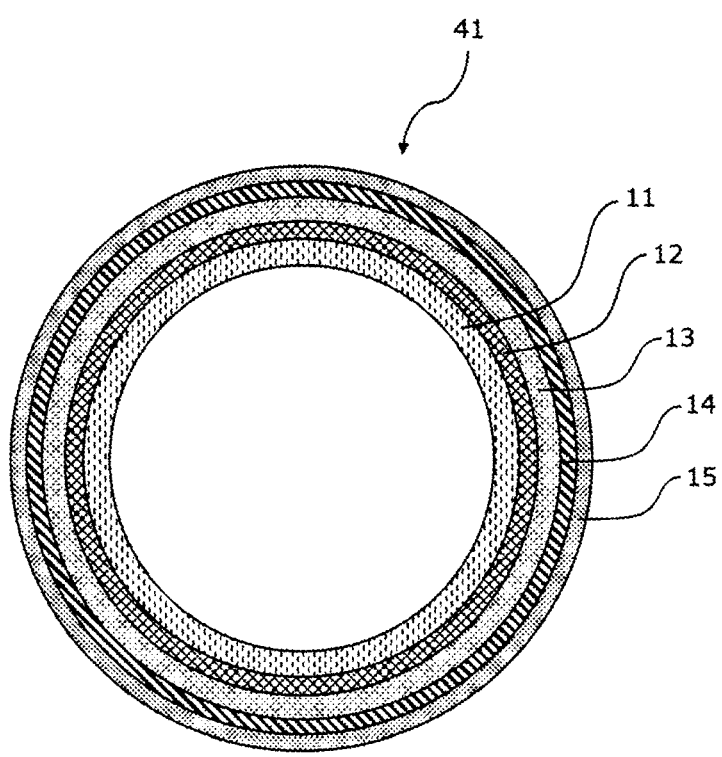
FIG. 2 is a schematic sectional view of a fixing film according to one embodiment of the present disclosure.
Figure 3:
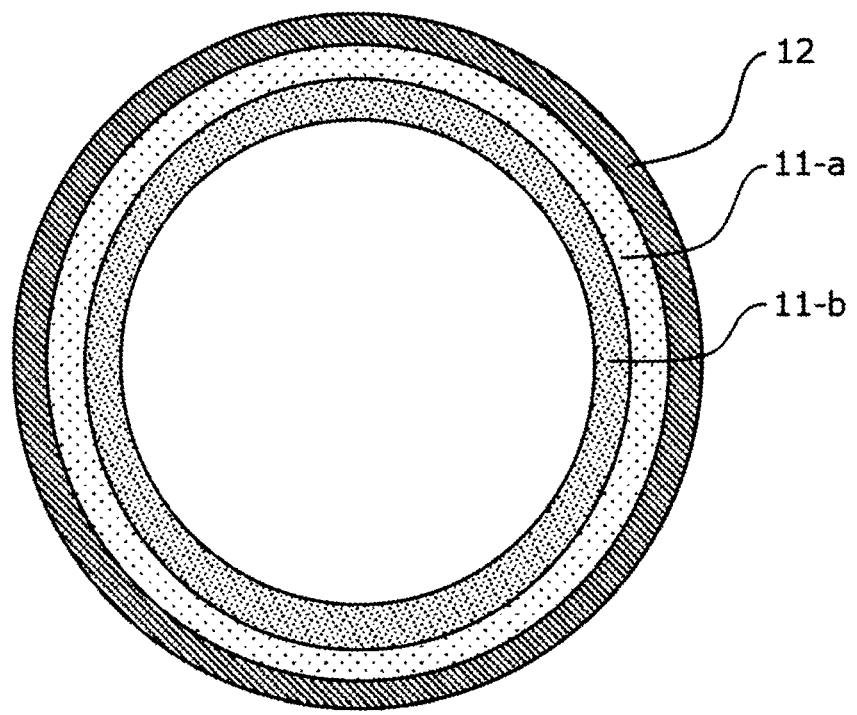
FIG. 3 is a schematic sectional view of a sliding layer according to one embodiment of the present disclosure.

As illustrated in FIG. 2, the fixing film 41 includes at least: a substrate 12 having a cylindrical shape; a sliding layer 11 formed on the inner peripheral surface side of the substrate 12; and a release layer 15 serving as a surface layer formed on the outer peripheral surface side of the substrate 12. The fixing film 41 may include an elastic layer 13 between the substrate 12 and the release layer 15, and the elastic layer 13 may be arranged with a primer. In addition, the release layer 15 may be arranged via an adhesive layer 14 between the release layer 15 and the elastic layer 13.

Each of the constituents is specifically described below.

[Substrate]

A metal, such as stainless steel (SUS), nickel, or a nickel alloy, is suitably used as a material for the substrate 12, considering that heat resistance and bending resistance are required. It is required that the heat capacity of the substrate 12 be reduced, but the mechanical strength thereof be increased. Accordingly, the thickness of the substrate 12 is preferably from 20 μm to 50 μm, more preferably from 25 μm to 45 μm.

[Elastic Layer]

The elastic layer 13 functions as a layer carried on a fixing member for applying a uniform pressure to unevenness of a toner image and a sheet of paper at the time of fixing. From the viewpoint of exhibiting such function, a cured product of an addition reaction-crosslinkable liquid silicone rubber is preferably used as the elastic layer 13 for, for example, the following reasons: such product is easily processed; such product can be processed with high dimensional accuracy; and no by-product is generated at the time of heat curing thereof. In addition, the addition reaction-crosslinkable liquid silicone rubber is preferred also from the viewpoint that elasticity can be adjusted by adjusting the degree of crosslinking thereof depending on the kind and addition amount of a filler described below.

In general, the addition reaction-crosslinkable liquid silicone rubber contains organopolysiloxane having an unsaturated aliphatic group, organopolysiloxane having active hydrogen bonded to silicon, and a platinum compound serving as a crosslinking catalyst. The organopolysiloxane having active hydrogen bonded to silicon forms a cross-linked structure through a reaction with an alkenyl group in the organopolysiloxane having an unsaturated aliphatic group by the catalytic action of the platinum compound.

The elastic layer 13 may contain a filler in order to, for example, improve and reinforce the thermal conductivity of the fixing film, and improve the heat resistance of the fixing film. A highly thermally conductive filler such as inorganic matter, particularly a metal or a metal compound, is preferred as the filler from the viewpoint of improving the thermal conductivity.

Specific examples of the highly thermally conductive filler include silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni). Those fillers may be used alone or as a mixture thereof. The average particle diameter of the highly thermally conductive filler is preferably 1 μm or more and 50

µm or less from the viewpoints of handleability and dispersibility. In addition, a filler having such a shape as a spherical shape, a pulverized shape, a plate shape, or a whisker shape is used as the highly thermally conductive filler, but from the viewpoint of dispersibility, a filler having a spherical shape is preferred.

For example, the elastic layer 13 is formed as described below. First, an addition reaction-crosslinkable silicone rubber composition obtained by blending the addition reaction-crosslinkable liquid silicone rubber and optionally the filler is applied onto the outer peripheral surface of the substrate 12 having the sliding layer 11 formed thereon by a known method to form a coated film of the composition. After that, the coated film is heated with a heating unit such as an electric furnace for a certain period of time to advance a crosslinking reaction. Thus, the elastic layer 13 can be formed.

The thickness of the elastic layer 13 is preferably 100 µm or more and 500 µm or less, more preferably 200 µm or more and 400 µm or less in terms of contribution to the surface hardness of the fixing film 41 and efficiency of thermal conduction to an unfixed toner at the time of fixing.

[Adhesive Layer]

The adhesive layer 14 is formed of a cured product of an addition-curable silicone rubber adhesive applied onto the surface of the elastic layer 13. The addition-curable silicone rubber adhesive contains an addition-curable silicone rubber having blended therein a self-adhesive component typified by a silane having a functional group, such as an acryloxy group, a hydrosilyl group (a SiH group), an epoxy group, or an alkoxysilyl group. The thickness of the adhesive layer 14 may be set to, for example, from 1 µm to 10 µm.

[Release Layer]

As the release layer 15, for example, a fluororesin tube obtained by molding a resin, such as a tetrafluoroethylene-perfluoro(alkyl vinyl ether) copolymer (PFA), polytetrafluoroethylene (PTFE), or a tetrafluoroethylene-hexafluoropropylene copolymer (FEP), into a tube shape is used. Of those, a PFA tube is preferred from the viewpoints of moldability and toner releasability. The adhesive property of the fluororesin tube may be improved by subjecting the inner surface of the fluororesin tube to, for example, sodium treatment, excimer laser treatment, or ammonia treatment in advance.

The thickness of the release layer 15 is preferably 50 µm or less. In the case where the thickness is 50 µm or less, when the constituents are laminated on each other, the elasticity of the elastic layer 13 serving as a lower layer can be maintained, and a situation in which surface hardness as a fixing member is excessively increased can be prevented. The thickness of the release layer 15 is preferably 5 µm or more from the viewpoints of suppressing unevenness at the time of covering with the fluororesin tube and durability.

The release layer 15 is formed by, for example, covering the outer peripheral surface of the elastic layer 13 having the addition-curable silicone rubber adhesive applied thereonto with the PFA tube by a known technology. A covering method with the PFA tube is not particularly limited, but for example, a method including covering the elastic layer 13 by externally expanding the PFA tube under a vacuum (vacuum expansion covering method) may be used. The excess addition-curable silicone rubber adhesive not contributing to adhesion and air having been involved at the time of covering with the PFA tube are present between the tube and the elastic layer 13 after covering. As a method of drawing out the excess adhesive and air, there is given a method including, while jetting air from a ring-shaped nozzle having an inner-diameter which is slightly larger than the outer diameter of the fixing film, moving the ring-shaped nozzle in a longitudinal direction of the fixing film, to thereby draw out the excess adhesive and air. In addition, the excess adhesive and air may also be removed by a method including, for example, drawing out the excess adhesive and air with an O ring having an inner-diameter which is smaller than the outer diameter of the fixing film.

Next, the addition-curable silicone rubber adhesive is heated for a predetermined period of time with a heating unit such as an electric furnace to be cured and bonded. Then, both end portions are cut into desired lengths, and thus a fixing film serving as a fixing member according to this embodiment can be obtained.

[Sliding Layer]

A resin having both high durability and high heat resistance, such as a polyimide resin, is suitably used as the sliding layer 11. The sliding layer 11 formed of a polyimide resin is obtained by applying a solution or gel containing a polyimide precursor (polyamic acid) on the inner peripheral surface of the substrate 12, and drying the solution or gel, followed by heating to cause a dehydration ring-closing reaction (imidization reaction) of the precursor. The polyimide precursor is obtained by polymerizing an aromatic tetracarboxylic dianhydride or a derivative thereof and an aromatic diamine in substantially equimolar amounts in an aprotic polar organic solvent.

Examples of the aromatic tetracarboxylic dianhydride include pyromellitic dianhydride (PMDA), 3,3',4,4'-biphenyltetracarboxylic dianhydride (BPDA), 3,3',4,4'-benzophenonetetracarboxylic dianhydride (BTDA), and 2,3,6,7-naphthalene tetracarboxylic dianhydride. Those aromatic tetracarboxylic dianhydrides may be used alone or in combination thereof.

Examples of the aromatic diamine include 4,4'-oxydianiline (4,4'-ODA), p-phenylenediamine (PPDA), and m-phenylenediamine (MPDA). Those aromatic diamines may be used alone or in combination thereof.

Examples of the aprotic polar organic solvent include N,N-dimethylacetamide (DMAC), dimethylformamide (DMF), and N-methyl-2-pyrrolidone (NMP).

The sliding layer 11 in the present disclosure has a first film 11-$a$ and a second film 11-$b$ laminated in the stated order from a side closer to the substrate 12. The first film 11-$a$ includes a first structural unit represented by the following formula (A), or the first structural unit and a second structural unit represented by the following formula (B), and has a mass ratio (A):(B) between the content of the first structural unit and the content of the second structural unit of from 100:0 to 60:40. In addition, the second film 11-$b$ includes only the second structural unit. When the sliding layer 11 has a laminated structure of the first film and the second film as described above, peeling of the sliding layer 11 from the substrate and occurrence of abnormal noise at the time of formation of an electrophotographic image can be prevented at high levels. That is, the second film 11-$b$ including a polyimide resin including only the second structural unit exhibits a high Martens hardness. Accordingly, stick-slip hardly occurs even when a process speed is low, and occurrence of abnormal noise can be prevented. Meanwhile, the second film 11-$b$ has a small linear expansion coefficient, and hence when the second film 11-$b$ is brought into direct contact with a metal substrate, the second film 11-$b$ cannot sufficiently follow the expansion and contraction of the metal substrate in association with change in temperature, and may be peeled. In view of the foregoing, in the present disclosure, the first film 11-$a$ having a larger linear expansion coefficient than the second film 11-b is interposed between the second film 11-b and the metal substrate 12. The first film 11-a can successfully follow the expansion and contraction of the metal substrate 12, and hence peeling of the sliding layer 11 from the metal substrate can be prevented more reliably.

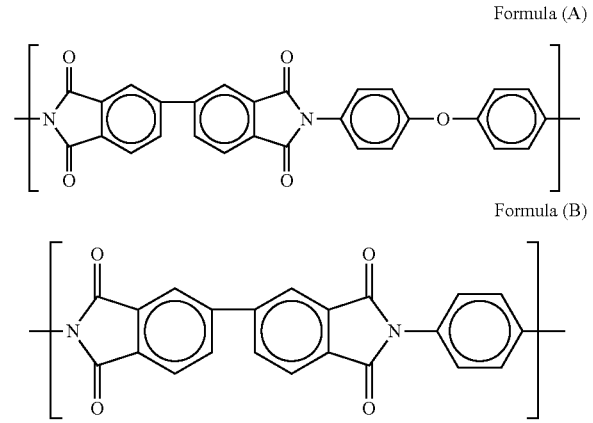

Formula (A)

Formula (B)

(First Polyimide Precursor Solution)

A first polyimide precursor solution used for forming the first film 11-a is described.

A polyimide resin having the first structural unit may be obtained by heating a solution of a polyimide precursor (polyamic acid A) having a structural unit A represented by the following formula (a) (hereinafter sometimes referred to as "polyimide precursor solution (a)") obtained by causing 3,3',4,4'-biphenyltetracarboxylic dianhydride and 4,4'-oxydianiline in substantially equimolar amounts to react with each other in an aprotic polar organic solvent to remove the solvent (the aprotic polar organic solvent) in the solution, and further imidizing the polyamic acid A.

Meanwhile, a polyimide resin having the second structural unit may be obtained by heating a solution of a polyimide precursor (polyamic acid B) having a structural unit B represented by the following formula (b) (hereinafter sometimes referred to as "polyimide precursor solution (b)") obtained by causing 3,3',4,4'-biphenyltetracarboxylic dianhydride and p-phenylenediamine in substantially equimolar amounts to react with each other in an aprotic polar organic solvent to remove the solvent (the aprotic polar organic solvent) in the solution, and further imidizing the polyamic acid B.

The first polyimide precursor solution is obtained by mixing the polyimide precursor solutions (a) and (b) at a mass ratio (structural unit A:structural unit B) between the structural unit A and the structural unit B of from 100:0 to 60:40. When the mass ratio is 100:0, the polyimide precursor solution (a) is the first polyimide precursor solution.

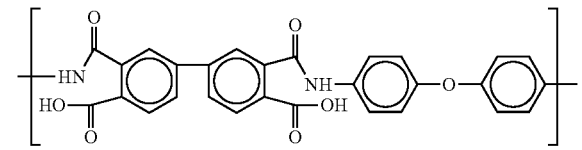

Formula (a)

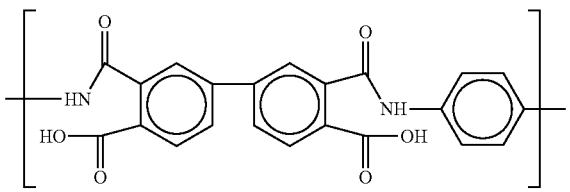

Formula (b)

(Second Polyimide Precursor Solution)

A second polyimide precursor solution used for forming the second film 11-b is described.

A polyimide resin including only the second structural unit may be obtained by heating the polyimide precursor solution (b) to remove the solvent (the aprotic polar organic solvent) in the solution, and further imidizing the polyamic acid B. Accordingly, the polyimide precursor solution (b) is the second polyimide precursor solution including the polyamic acid B as a sole polyamic acid.

(Method of Forming Sliding Layer 11)

Next, a method of forming the sliding layer 11 using a polyimide resin is described with reference to FIG. 4.

In general, a film of a polyimide resin may be formed by, for example, applying a polyimide precursor solution as described above. Also in this embodiment, the polyimide sliding layer is formed by applying the polyimide precursor solution onto the inner peripheral surface of the substrate 12, followed by heating and drying to cause a dehydration ring-closing reaction. Any known method, such as a dip method, a ring coating method, or a spray method, is applicable as an application method. Of those, a ring coating method is preferred.

Figure 4:
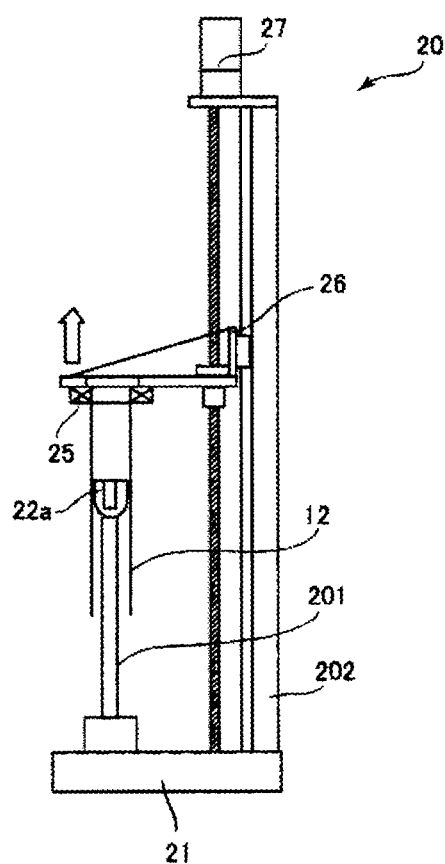
FIG. 4 is a schematic view of an application device used at the time of formation of a sliding layer in each of Examples.

In a ring coating method application device 20 illustrated in FIG. 4, support columns 201 and 202 parallel to each other are arranged on a substrate 21. An application head 22a is fixed onto the support column 201, and an application liquid supply device (not shown) is connected thereto. The application head 22a is formed into a cylindrical form, has a supply path from the application liquid supply device arranged in a center portion thereof, and has a slit (not shown) perpendicular to the support column 201 on the outer peripheral surface thereof. Moreover, an application liquid (polyimide precursor solution) supplied from the application liquid supply device is discharged from the slit so as to cover the outer peripheral surface of the application head 22a.

A workpiece moving device 26 is supported by the support column 202 so as to be movable along the support column 202. The workpiece moving device 26 moves up and down in the drawing sheet of FIG. 4 along the support column 202 through rotational driving by a motor 27 arranged on the support column 202. A workpiece hand 25 for holding the substrate 12 is arranged on the distal end of the workpiece moving device 26. Accordingly, the substrate 12 held by the workpiece hand 25 is moved up and down in the drawing sheet of FIG. 4 together with the workpiece hand 25 by the workpiece moving device 26.

When the application liquid is applied onto the inner peripheral surface of the substrate 12, while the polyimide precursor solution serving as the application liquid is supplied from the application liquid supply device to the outer peripheral surface of the application head 22a, the substrate 12 is moved along the outer periphery of the application head 22a. Thus, the application liquid can be almost uniformly applied throughout the entire inner peripheral surface of the substrate 12. In the application device 20, the application thickness of the application liquid may be arbitrarily changed by adjusting the supply speed of the application liquid or the moving speed of the workpiece moving device 26.

The polyimide precursor solution applied onto the inner peripheral surface of the substrate 12 is fired with a heating unit such as an electric furnace to provide the polyimide sliding layer 11. The heating of the applied polyimide precursor solution is preferably performed in multiple stages. That is, first, in a first stage of the firing (first-stage firing), at least part of the solvent included in the polyimide precursor solution is removed through heating to form a coated film of the polyimide precursor. Then, an imidization reaction of the polyimide precursor is preferably advanced in and after a second stage of the firing (second-stage firing). In particular, it is preferred that, in the first-stage firing, the solvent in the coated film of the polyimide precursor solution be dried through heating at a temperature lower than the boiling point of the solvent. Next, it is preferred that the polyamic acid A and the polyamic acid B in the coated film of the polyimide precursor obtained after the first-stage firing be imidized in multiple stages including the second-stage firing performed at a temperature higher than the temperature of the first-stage firing and a third-stage firing performed at a temperature higher than the temperature of the second-stage firing.

Specifically, first, the first polyimide precursor solution is applied onto the inner peripheral surface of the substrate 12 to form a coated film "a". At this time, the coated film "a" may be heated at a temperature T1-1 which is lower than a boiling point of a solvent contained in the first polyimide precursor solution to evaporate the solvent in the coated film "a", and to dry the coated film "a" (first drying step, i.e., first-stage baking of the coated film "a"). Next, the second polyimide precursor solution is applied onto the inner peripheral surface of the coated film "a" to form a coated film "b". At this time, the coated film "B" may be heated at a temperature T1-2, which is lower than a boiling point of a solvent contained in the second polyimide precursor solution to evaporate the solvent in the coated film "b" and to dry the coated film "b" (second drying step, i.e., first-stage baking of the coated film "b").

Next, under the state in which the coated film "a" and the coated film "b" are laminated on each other, the coated film "a" and the coated film "b", both of which may be dried in the first baking, are heated at a temperature T2 (Second stage baking step), and then heated at a temperature T3 (Third stage baking step). The temperature T2 is higher than the temperature T1-1 and T1-2, and the temperature T3 is higher than the temperature T2. By the second stage baking step and the third stage baking step, the polyamic acid A, or the polyamic acid A and the polyamic acid B in the coated film "a" is imidized, and the polyamic acid B in the coated film "b" is imidized. Thus, the sliding layer 11 formed of a laminated film of the first film 11-$a$ and the second film 11-$b$ is obtained.

When the second polyimide precursor solution is applied onto the inner peripheral surface of the coated film "a" to form the coated film "b" before the second-stage firing (imidization reaction) of the coated film "a", and after that, the polyamic acids in the coated film "a" and the coated film "b" are imidized, the imidization reaction can be advanced also at an interface between the first film and the second film. Accordingly, delamination at the interface between the first film and the second film can be prevented. The second-stage firing is preferably gradually performed at a temperature of 260° C. or less from the viewpoint of advancing the imidization without interrupting molecular mobility of the polyamic acids. In addition, the third-stage firing is preferably performed at a temperature as high as 350° C. or more from the viewpoint of sufficiently advancing the imidization reaction for obtaining the characteristics of polyimide. The third-stage firing may be performed by gradually increasing the temperature as in the case of the second-stage firing, and in this case, the highest temperature is preferably 350° C. or more.

The thickness of the sliding layer 11 in terms of the total of the first film 11-$a$ and the second film 11-$b$ is preferably from 5 µm to 25 µm. Particularly when the total thickness is from 7 µm to 20 µm, both abrasion resistance in the fixing nip portion and thermal conductivity for transferring heat from the heater to the substrate 12 are easily achieved.

When the thickness of the sliding layer 11 is made such that each of the thicknesses of the first film 11-$a$ and the second film 11-$b$ is 7 µm, for example, the following method may be used. Specifically, it is appropriate that, depending on the polyimide precursor solid content concentration (about 18 mass %) of each of the first polyimide precursor solution and the second polyimide precursor solution, each of the precursor solutions be applied onto the inner peripheral surface of the substrate 12 by, for example, a ring coating method so that the application thickness of each of the precursor solutions is 40 µm.

(Imidization Ratio)

In this embodiment, the imidization ratio of the second film 11-$b$ is preferably 75% or more. Herein, the "imidization ratio" refers to a reaction ratio in an imidization reaction in which a precursor, i.e., polyamic acid, in the polyimide precursor solution is heated and fired to be dehydrated and cyclized, i.e., imidized to generate polyimide. The imidization ratio may be determined by an attenuated total reflectance (ATR) method with a Fourier transform infrared spectrophotometer (FT-IR). A specific measurement method is described in Examples.

When the imidization ratio of the second film is 75% or more, a reduction in abrasion resistance due to the flexibility of the sliding layer in itself is prevented, and an increase in torque caused by abrasion powder in the fixing nip portion can be suppressed. The imidization ratio of the second film is generally 100% or less.

(Martens Hardness)

In this embodiment, it is preferred that the Martens hardness of the second film measured by a nanoindentation method be larger than the Martens hardness of the first film measured by the nanoindentation method. Specifically, it is preferred that the Martens hardness of the second film be 350 N/mm 2 or more and 450 N/mm 2 or less, and the Martens hardness of the first film be 200 N/mm 2 or more and 300 N/mm 2 or less. When the Martens hardnesses of the first film and the second film each fall within the above-mentioned range, a sliding layer in which a stick-slip phenomenon is less liable to occur in sliding friction with respect to the ceramic heater, and which is more excellent in ability to suppress the occurrence of abnormal noise can be obtained. The details of a measurement method are described in Examples.

(Linear Expansion Coefficient)

In this embodiment, it is preferred that the linear expansion coefficient of the second film be smaller than the linear expansion coefficient of the first film. Specifically, it is preferred that the linear expansion coefficient of the second film be $1.5 \times 10^{-6}$/° C. or more and $5.0 \times 10^{-6}$/° C. or less, and the linear expansion coefficient of the first film be $2.0 \times 10^{-}$ s/ρC or more and 5.0×10$^{-5}$/° C. or less. When the linear expansion coefficients of the first film and the second film each fall within the above-mentioned range, peeling of the sliding layer from the metal substrate and occurrence of abnormal noise at the time of formation of an electrophotographic image can be prevented at further higher levels. The details of a measurement method are described in Examples.

According to one aspect of the present disclosure, a fixing film in which peeling of a sliding layer from a substrate and occurrence of abnormal noise at the time of formation of an electrophotographic image can be prevented at high levels can be provided. In addition, according to another aspect of the present disclosure, a fixing device that contributes to long-term stable formation of a high-quality electrophotographic image, and an electrophotographic image forming apparatus capable of stably forming a high-quality electrophotographic image can be provided.

EXAMPLES

The present disclosure is more specifically described below by way of Examples and Comparative Examples, but the present disclosure is not limited by these Examples.

First, evaluation methods for physical properties are described.

[Martens Hardness]

A Martens hardness of the sliding layer 11 in its normal direction (indentation direction) was measured by a nanoindentation method with a microhardness tester (product name: PICODENTOR HM-500, manufactured by Fischer Instruments K.K.). A diamond Vickers indenter was used as a probe (indenter). A sample obtained by peeling the sliding layer 11 from the substrate layer 12 with a razor or the like to isolate the sliding layer 11 was measured under the state in which a surface to be measured was on a front surface side and under the state in which a back surface side was bonded to a SUS plate having a thickness of 300 μm with an adhesive or the like. The measurement conditions were set as follows: a temperature of 23° C., a test load of 2 mN, and a load application time of 7 seconds. The Martens hardness was calculated from a load-displacement curve (graph between a load and an indentation displacement) obtained through the measurement. More specifically, when a surface area to be calculated from a maximum indentation depth "h" of the indenter at the time of application of a maximum load F is represented by As(h), the Martens hardness (HM) can be obtained by the following formula.

$$HM\ [N/mm^2]=F/As(h)=F/(26.43 \times h^2)$$

[Linear Expansion Coefficient]

A linear expansion coefficient of the sliding layer 11 in its circumferential direction was calculated from a curve of a deformation amount against a temperature obtained in conformity with Japan Industrial Standards JIS K 7197:2012 (Testing method for linear thermal expansion coefficient of plastics by thermomechanical analysis) with a thermomechanical analyzer (TMA). However, under the state in which the first film and the second film are laminated on each other, the linear expansion coefficient of each film cannot be obtained. Accordingly, a sliding layer formed only of the first film 11-a and a sliding layer formed only of the second film 11-b were separately made on the inner peripheral surface of the substrate layer 12, and a sample obtained by isolating each sliding layer from the substrate layer 12 was measured for a linear expansion coefficient. The measurement dimensions were set as follows: 10 mm in length in the circumferential direction by 5 mm in width, and the measurement conditions were set as follows: a load of 0.02 N, and a temperature increase rate of 5° C./min. A deformation amount per 1° C. was calculated as an average of the values at from 50° C. to 200° C., and was used as the linear expansion coefficient [/° C.].

[Imidization Ratio]

The imidization ratio of the second film 11-b was calculated by an attenuated total reflectance (ATR) method with a Fourier transform infrared spectrophotometer (FT-IR). An infrared absorption spectrum was obtained from a surface of the second film 11-b of the sliding layer 11 through use of germanium as an ATR prism under the conditions of a resolution of 4 cm' and a number of scans of 8. In the spectrum, an absorbance at a peak around 1,712 cm' based on C=O vibration in an imide ring was represented by "a". In addition, when the second film included the second structural unit, an absorbance at a peak around 1,515 cm' based on skeleton vibration in the imide ring was represented by "0". When the second film included the first structural unit, the peak based on skeleton vibration in the imide ring appeared around 1,500 cm$^{-1}$, and hence an absorbance for the peak was represented by "β". The ratio α/β between the absorbances α and β serves as an indicator of generation of an imide ring, that is, the degree of advancement of imidization. Further, when the second film 11-b obtained through firing at a final imidization temperature of 450° C. for 4 hours is assumed as a state in which an imidization reaction is completely finished (an imidization ratio of 100%), and the ratio α/β at this time is represented by $(α/β)_{100}$, the imidization ratio is defined by the following formula.

Imidization ratio [%]=(α/β)/(α/β)$_{100}$×100

Now, the evaluation of the fixing film 41 formed through a series of steps described below is described.

[Evaluation of Durability]

The durability of the fixing film 41 was evaluated with the fixing device 40 of an on-demand type illustrated in FIG. 1 in which a fixing film of each of Examples and Comparative Examples was incorporated. The pressure roller 45 was driven to rotate so that a moving speed (peripheral speed) on the surface of the pressure roller 45 was 320 mm/sec under the state in which a pressing force on one end side thereof was 156.8 N (16 kgf), that is, the total pressing force was 313.6 N (32 kgf). Under the state in which a surface temperature of a sheet passing portion of the fixing film 41 was controlled to 170° C., 500,000 sheets of paper having the same size (A4 horizontal, product name: GF-0081, manufactured by Canon Inc.) were continuously passed at a rate of 70 sheets/min. Gram of grease (product name: MOLYKOTE HP-300, manufactured by DuPont Toray Specialty Materials K.K.) serving as a lubricant was applied onto the inner peripheral surface of the fixing film 41. The grease contained PTFE powder fine particles (particle diameter: 3 μm) serving as a thickener and perfluoropolyether serving as a base oil component. Moreover, evaluation was performed based on the following criteria.

Rank AA: 500,000 Sheets of paper were able to be passed while load torque remained at 600 mN·m or less.

Rank A: 500,000 Sheets of paper were able to be passed while load torque remained at more than 600 mN·m and 800 mN·m or less.

Rank B: Load torque exceeded 800 mN·m at the time point when the number of sheets passed reached 300,000.

Rank C: Part of the sliding layer was peeled and the substrate was exposed at the time point when the number of sheets passed reached 100,000.

[Evaluation of Slidability]

The evaluation of the slidability of the fixing film 41 was performed under an initial state and a state after passage of 500,000 sheets of paper based on the following criteria.

Rank AA: When the process speed of the fixing apparatus was set to 60 mm/sec, there was not observed, under each of the initial state and the state after passage of 500,000 sheets of paper, occurrence of abnormal noise due to self-excited vibration of the fixing film in association with occurrence of stick-slip. Here, the stick slip is more likely to occur as the process speed is slower. Therefore, for this evaluation, the slower the process speed, the more severe the conditions.

Rank A: When the process speed of the fixing apparatus was set to 120 mm/sec, there was not observed, under each of the initial state and the state after passage of 500,000 sheets of paper, occurrence of abnormal noise due to self-excited vibration of the fixing film in association with occurrence of stick-slip.

Rank B: When the process speed of the fixing apparatus was set to 120 mm/sec, there was observed, under any one of the initial state and the state after passage of 500,000 sheets of paper, occurrence of abnormal noise due to self-excited vibration of the fixing film in association with occurrence of stick-slip.

Subsequently, Examples and Comparative Examples are specifically described.

Example 1

3,3',4,4'-Biphenyltetracarboxylic dianhydride and 4,4'-oxydi aniline in substantially equimolar amounts were caused to react with each other in N-methyl-2-pyrrolidone (NMP). Thus, a polyimide precursor solution (a) containing the polyamic acid A having the structural unit A represented by the formula (a) described above and having a solid content concentration of 18 mass % and a viscosity of 6 Pa·s was obtained. Moreover, the polyimide precursor solution (a) was used as a first polyimide precursor solution. The first polyimide precursor solution was applied onto the inner peripheral surface of the substrate 12 so as to give an application thickness of 40 μm by a ring coating method to form the coated film "a" of the first polyimide precursor solution. Stainless steel (SUS) having an inner diameter of 24 mm and a thickness of 30 μm was used as the cylindrical substrate 12. Next, the cylindrical substrate was heated in a heating furnace at a temperature of 150° C. for 5 minutes to evaporate NMP from the coated film "a" (first-stage firing of the coated film "a"). The cylindrical substrate was removed from the heating furnace. Next, a second polyimide precursor solution was applied onto the inner peripheral surface of the coated film "a" as described below.

First, a polyimide precursor solution (b) containing the polyamic acid B having the structural unit B represented by the formula (b) described above and having a solid content concentration of 18 mass % and a viscosity of 6 Pa·s obtained by causing 3,3',4,4'-biphenyltetracarboxylic dianhydride and p-phenylenediamine in substantially equimolar amounts to react with each other in NMP was used as the second polyimide precursor solution. The second polyimide precursor solution was applied onto the inner peripheral surface of the coated film "a" so as to give a thickness of 40 μm by a ring coating method to form a coated film "b" of the second polyimide precursor solution. Next, the cylindrical substrate was heated again in the heating furnace at a temperature of 150° C. for 5 minutes to evaporate NMP from the coated film "b" (first-stage firing of the coated film "b"). Then, the cylindrical substrate having a laminated film of the coated film "a" and the coated film "b" was loaded into the heating furnace. Then, the coated film "a" and the coated film "b" were heated in a stepwise manner at a temperature of from 200° C. to 260° C. for 1 hour (second-stage firing), and were further heated in a stepwise manner at a temperature of from 260° C. to 350° C. for 1 hour (third-stage firing). Thus, the polyamic acid A in the coated film "a" and the polyamic acid B in the coated film "b" were imidized to provide the sliding layer 11 in which the first film 11-a and the second film 11-b each having a thickness of 7 μm were laminated on each other.

Subsequently, a hydrosilyl-based silicone primer (product name: DY39-051 A/B, manufactured by Dow Toray Co., Ltd.) was applied onto the outer peripheral surface of the cylindrical substrate 12 having the sliding layer 11 formed thereon, and was heated at 200° C. for 5 minutes to be cured. Then, an addition reaction-crosslinkable liquid silicone rubber composition containing an addition reaction-crosslinkable liquid silicone rubber and alumina serving as a highly thermally conductive filler was applied onto the outer peripheral surface of the cured product so as to give a thickness of 250 and was heated at 200° C. for 30 minutes to be cured, to thereby form the silicone rubber elastic layer 13. The thermal conductivity of the elastic layer 13 was 1.0 W/mK. Further, the adhesive layer 14 having a thickness of 3 μm formed of an addition-curable silicone rubber adhesive (product name: SE1819 CV A/B, manufactured by Dow Toray Co., Ltd.) was formed on the outer peripheral surface of the elastic layer 13. Then, the outer peripheral surface of the adhesive layer 14 was covered with a PFA tube having a thickness of 20 μm obtained through extrusion molding, which served as the fluororesin release layer 15, by a method including covering the adhesive layer 14 by externally expanding the PFA tube under a vacuum (vacuum expansion covering method), followed by heating at 200° C. for 2 minutes to cure the adhesive layer 14. A tube whose inner surface had been subjected to ammonia treatment in advance was used as the PFA tube.

The fixing film 41 produced as described above was incorporated in the fixing device, and the durability and slidability of the sliding layer 11 were evaluated under the above-mentioned conditions. The results are shown in Table 1.

Example 2

A solution obtained by mixing the polyimide precursor solution (a) and the polyimide precursor solution (b) prepared in Example 1 at a mass ratio (structural unit A:structural unit B) of 80:20 was used as a first polyimide precursor solution. A fixing film including the sliding layer 11 in which a first film and a second film each having a thickness of 7 μm were laminated on each other was obtained by the same procedure as in Example 1 except for the foregoing.

Example 3

A solution obtained by mixing the polyimide precursor solution (a) and the polyimide precursor solution (b) prepared in Example 1 at a mass ratio (structural unit A:structural unit B) of 60:40 was used as a first polyimide precursor solution. A fixing film including the sliding layer 11 in which a first film and a second film each having a thickness of 7 μm were laminated on each other was obtained by the same procedure as in Example 1 except for the foregoing.

Example 4

The same first polyimide precursor solution and second polyimide precursor solution as in Example 1 were used. A film formation step for the first film 11-a and the second film 11-b was performed by the same procedure as in Example 1 up to the second-stage firing. Then, in the third-stage firing, imidization was advanced through heating in a stepwise manner at a temperature of from 260° C. to 300° C. for 1 hour. A fixing film including the sliding layer 11 in which the films each having a thickness of 7 μm were laminated on each other was obtained by the same procedure as in Example 1 except for the foregoing.

Example 5

The same first polyimide precursor solution and second polyimide precursor solution as in Example 1 were used. A film formation step for the first film 11-a and the second film 11-b was performed by the same procedure as in Example 1 up to the second-stage firing. Then, in the third-stage firing, imidization was advanced through heating in a stepwise manner at a temperature of from 260° C. to 400° C. for 1 hour. A fixing film including the sliding layer 11 in which the films each having a thickness of 7 μm were laminated on each other was obtained by the same procedure as in Example 1 except for the foregoing.

Example 6

The same first polyimide precursor solution and second polyimide precursor solution as in Example 2 were used. The same procedure as in Example 5 was performed in and after a film formation step for the first film 11-a and the second film 11-b, and thus a fixing film including the sliding layer 11 in which the films each having a thickness of 7 μm were laminated on each other was obtained.

Example 7

The same first polyimide precursor solution and second polyimide precursor solution as in Example 3 were used. The same procedure as in Example 5 was performed in and after a film formation step for the first film 11-a and the second film 11-b, and thus a fixing film including the sliding layer 11 in which the films each having a thickness of 7 μm were laminated on each other was obtained.

Comparative Example 1

The polyimide precursor solution (a) prepared in Example 1 was used as a first polyimide precursor solution and a second polyimide precursor solution. The polyimide precursor solution (a) was applied onto the inner peripheral surface of the substrate 12 so as to give an application thickness of 80 μm by a ring coating method. The coated film was heated in a heating furnace at 150° C. for 5 minutes to evaporate NMP serving as a solvent to be solidified, followed by heating in a stepwise manner at a temperature of from 200° C. to 260° C. for 1 hour. Further, the resultant was heated in a stepwise manner at a temperature of from 260° C. to 350° C. for 1 hour. Through those steps, a fixing film including the sliding layer 11 that was formed of the same composition with no distinction between a first film and a second film and had a thickness of 14 μm was obtained.

Comparative Example 2

The polyimide precursor solution (b) prepared in Example 1 was used as a first polyimide precursor solution and a second polyimide precursor solution. A fixing film including the sliding layer 11 that was formed of the same composition with no distinction between a first film and a second film and had a thickness of 14 μm was obtained by the same procedure as in Example 5 except for the foregoing.

Comparative Example 3

The polyimide precursor solution (b) prepared in Example 1 was used as a first polyimide precursor solution. Meanwhile, the polyimide precursor solution (a) prepared in Example 1 was used as a second polyimide precursor solution. A fixing film including the sliding layer 11 in which the films each having a thickness of 7 μm were laminated on each other was obtained by the same procedure as in Example 4 except for the foregoing.

Comparative Example 4

As in Comparative Example 1, the polyimide precursor solution (a) prepared in Example 1 was used as a first polyimide precursor solution and a second polyimide precursor solution. The film formation was performed by the same procedure as in Example 5, and a fixing film including the sliding layer 11 that was formed of the same composition with no distinction between a first film and a second film and had a thickness of 14 μm was obtained.

The fixing films 41 according to Examples 2 to 7 and Comparative Examples 1 to 4 produced as described above were each incorporated in the fixing device 40, and the durability and slidability of the sliding layer 11 were evaluated in the same manner as in Example 1. The results are shown in Table 1.

TABLE 1

| | First film 11-a | | | Second film 11-b | | | | Durability (adhesiveness · abrasion resistance) Evaluation rank | Slidability (abnormal noise) Evaluation rank |
|---|---|---|---|---|---|---|---|---|---|
| | Structural unit (A):(B) | Martens hardness [N/mm$^2$] | Linear expansion coefficient [/° C.] | Structural unit | Martens hardness [N/mm$^2$] | Linear expansion coefficient [/° C.] | Imidization ratio [%] | | |
| Example 1 | 100:0 | 229.5 | 3.5E−05 | (B) | 389.2 | 3.2E−06 | 78.7 | AA | AA |
| Example 2 | 80:20 | 261.4 | 2.4E−05 | (B) | 389.2 | 3.2E−06 | 78.7 | AA | AA |
| Example 3 | 60:40 | 293.4 | 1.6E−05 | (B) | 389.2 | 3.2E−06 | 78.7 | A | AA |

TABLE 1-continued

|  | First film 11-a | | | Second film 11-b | | | | Durability (adhesiveness · abrasion resistance) Evaluation rank | Slidability (abnormal noise) Evaluation rank |
|---|---|---|---|---|---|---|---|---|---|
|  | Structural unit (A):(B) | Martens hardness [N/mm²] | Linear expansion coefficient [/° C.] | Structural unit | Martens hardness [N/mm²] | Linear expansion coefficient [/° C.] | Imidization ratio [%] | | |
| Example 4 | 100:0 | 201.5 | 4.9E−05 | (B) | 339.0 | 5.5E−06 | 69.3 | A | A |
| Example 5 | 100:0 | 239.8 | 2.0E−05 | (B) | 448.5 | 1.5E−06 | 84.9 | AA | AA |
| Example 6 | 80:20 | 291.5 | 1.5E−05 | (B) | 448.5 | 1.5E−06 | 84.9 | A | AA |
| Example 7 | 60:40 | 324.9 | 9.0E−06 | (B) | 448.5 | 1.5E−06 | 84.9 | A | AA |
| Comparative Example 1 | 100:0 | 229.5 | 3.5E−05 | (A) | 229.5 | 3.5E−05 | 96.2 | B | B |
| Comparative Example 2 | 0:100 | 448.5 | 1.5E−06 | (B) | 448.5 | 1.5E−06 | 84.9 | C | A |
| Comparative Example 3 | 0:100 | 352.0 | 5.5E−06 | (A) | 201.5 | 5.0E−05 | 89.5 | C | B |
| Comparative Example 4 | 100:0 | 239.8 | 2.0E−05 | (A) | 239.8 | 2.0E−05 | 98.0 | B | B |

It was found from the results of Examples 1 to 7 that when the highly flexible first film 11-*a* formed of a polyimide resin containing 60 mass % or more of the first structural unit represented by the formula (A) was formed on a substrate 12 side, and the hard and rigid second film 11-*b* formed of a polyimide resin having the second structural unit represented by the formula (B) was formed on a sliding surface side with respect to the ceramic heater as the sliding layer 11, a sliding layer having satisfactory adhesiveness to the substrate 12 and having a high ability to suppress the occurrence of abnormal noise and abrasion was obtained.

In each of Comparative Examples 1 and 4, the substrate was not exposed, and no problem occurred in the adhesiveness between the sliding layer and the substrate. However, the second film was formed of a polyimide resin having the first structural unit, and hence abnormal noise occurred from an initial stage of endurance, and an increase in torque due to progression of endurance abrasion was observed. Meanwhile, in each of Comparative Examples 2 and 3, the adhesiveness between the sliding layer and the substrate was insufficient, the substrate was exposed during endurance, and an increase in torque was observed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-091019, filed Jun. 3, 2022 and Japanese Patent Application No. 2023-079668, filed May 12, 2023, which are hereby incorporated by reference herein in their entirety.

What is claimed is:

1. A fixing film comprising:
a substrate having a cylindrical shape;
a sliding layer on an inner peripheral surface side of the substrate, the sliding layer comprising a polyimide resin; and
a release layer on an outer peripheral surface side of the substrate,
the sliding layer having a first film and a second film laminated in stated order from a side closer to the substrate,
the first film including a first structural unit represented by formula (A), or including the first structural unit and a second structural unit represented by formula (B), and the second film including only the second structural unit, wherein a mass ratio (A):(B) of the first structural unit and the second structural unit contained in the first film is 100:0 to 60:40:

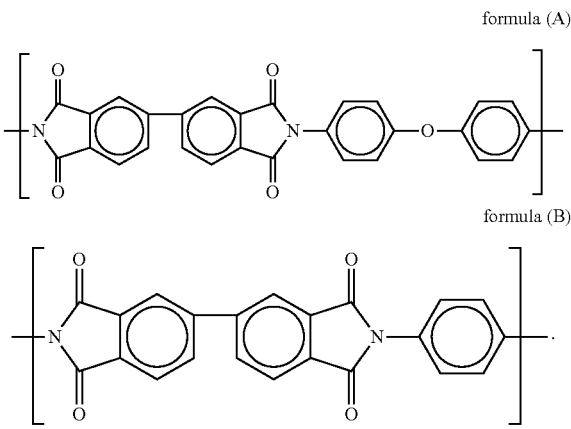

formula (A)

formula (B)

2. The fixing film according to claim 1, wherein the second film has an imidization ratio of 75% or more.

3. The fixing film according to claim 1,
wherein a Martens hardness of the second film measured by a nanoindentation method is larger than a Martens hardness of the first film measured by the nanoindentation method, and
wherein a linear expansion coefficient of the second film is smaller than a linear expansion coefficient of the first film.

4. The fixing film according to claim 3,
wherein the Martens hardness of the second film is 350 N/mm 2 to 450 N/mm 2, and
wherein the Martens hardness of the first film is 200 N/mm 2 to 300 N/mm 2.

5. The fixing film according to claim 3,
wherein the linear expansion coefficient of the second film is $1.5 \times 10^{-6}$/° C. to $5.0 \times 10^{-6}$/° C., and
wherein the linear expansion coefficient of the first film is $2.0 \times 10^{-5}$/° C. to $5.0 \times 10^{-5}$/° C.

6. A method of producing a fixing film, the fixing film including: a substrate having a cylindrical shape; a sliding layer that is formed on an inner peripheral surface side of the substrate and includes a polyimide resin; and a release layer that is formed on an outer peripheral surface side of the substrate, wherein the sliding layer has a first film and a second film laminated in stated order from a side closer to the substrate, wherein the first film includes a first structural unit represented by formula (A), or includes the first structural unit and a second structural unit represented by formula (B), and has a mass ratio (A):(B) between a content of the first structural unit and a content of the second structural unit of from 100:0 to 60:40, and wherein the second film includes only the second structural unit:

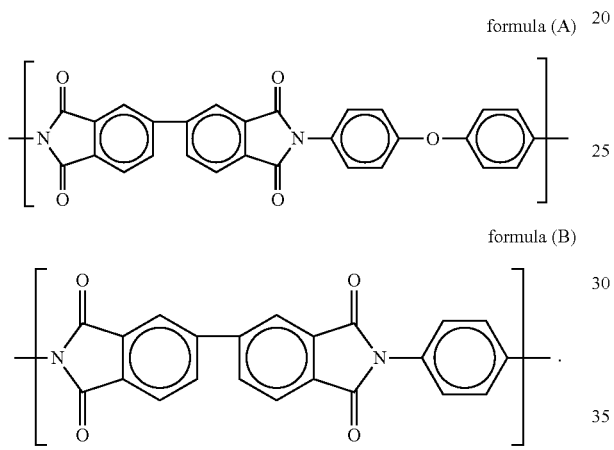

formula (A)

formula (B)

the method comprising the steps of:

(i) forming, on an inner peripheral surface of the substrate, a coated film "a" of a first polyimide precursor solution obtained by mixing a polyamic acid A having a structural unit A represented by formula (a) and a polyamic acid B having a structural unit B represented by formula (b) at a mass ratio (structural unit A:structural unit B) between the structural unit A and the structural unit B of from 100:0 to 60:40;

(ii) forming, on an inner peripheral surface of the coated film "a", a coated film "b" of a second polyimide precursor solution including the polyamic acid B as a sole polyamic acid; and (iii) imidizing the polyamic acid A, or the polyamic acid A and the polyamic acid B in the coated film "a", and imidizing the polyamic acid B in the coated film "b" to form the second film:

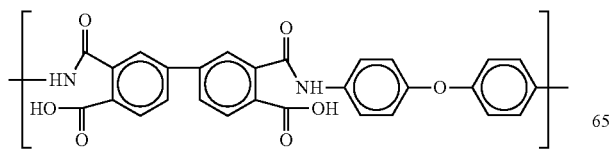

formula (a)

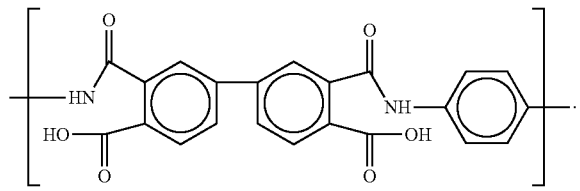

formula (b)

7. The method of producing a fixing film according to claim 6, wherein the step (i) includes a first drying step of heating the coated film "a" at a temperature T1-1 which is lower than a boiling point of a solvent contained in the first polyimide precursor solution, wherein the step (ii) includes a second drying step of heating the coated film "b" at a temperature T1-2 which is lower than a boiling point of a solvent contained in the second polyimide precursor solution, and wherein the step (iii) includes heating the coated film "a" which has been dried in the first drying step and the coated film "b" which has been dried in the second drying step, at a temperature T2 which is higher than the temperature T1-1 and T1-2, and then further heating the coated film "a" and the coated film "b" at a temperature T3 which is higher than the temperature T2, to imidize the polyamic acid A and the polyamic acid B to obtain the first film and the second film.

8. A fixing device comprising a fixing film, wherein the fixing film includes:

a substrate having a cylindrical shape;

a sliding layer on an inner peripheral surface side of the substrate, the sliding layer comprising a polyimide resin; and a release layer on an outer peripheral surface side of the substrate, wherein the sliding layer has a first film and a second film laminated in stated order from a side closer to the substrate, wherein the first film includes a first structural unit represented by formula (A), or includes the first structural unit and a second structural unit represented by formula (B), wherein the second film includes only the second structural unit, and wherein a mass ratio (A):(B) of the first structural unit and the second structural unit contained in the first film is 100:0 to 60:40:

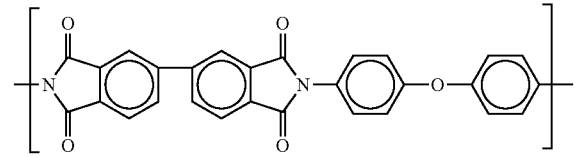

formula (A)

-continued formula (B)

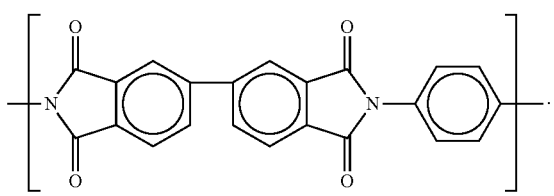

9. An electrophotographic image forming apparatus comprising a fixing device,
wherein the fixing device includes a fixing film, and
wherein the fixing film includes:
a substrate having a cylindrical shape;
a sliding layer on an inner peripheral surface side of the substrate, the sliding layer comprising a polyimide resin; and
a release layer on an outer peripheral surface side of the substrate,
wherein the sliding layer has a first film and a second film laminated in stated order from a side closer to the substrate,
wherein the first film includes a first structural unit represented by formula (A), or includes the first structural unit and a second structural unit represented by formula (B), and
wherein the second film includes only the second structural unit, and wherein
a mass ratio (A):(B) of the first structural unit and the second structural unit contained in the first film is 100:0 to 60:40:

formula (A)

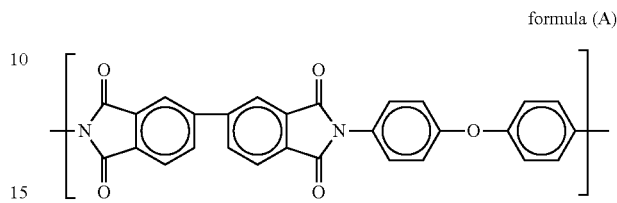

formula (B)

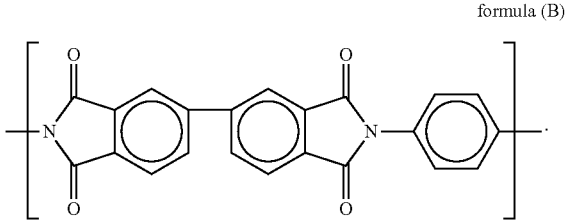

* * * * *